(No Model.)
H. T. DAVIS.
RECIPROCATING CHURN.
No. 254,121.  Patented Feb. 28, 1882.
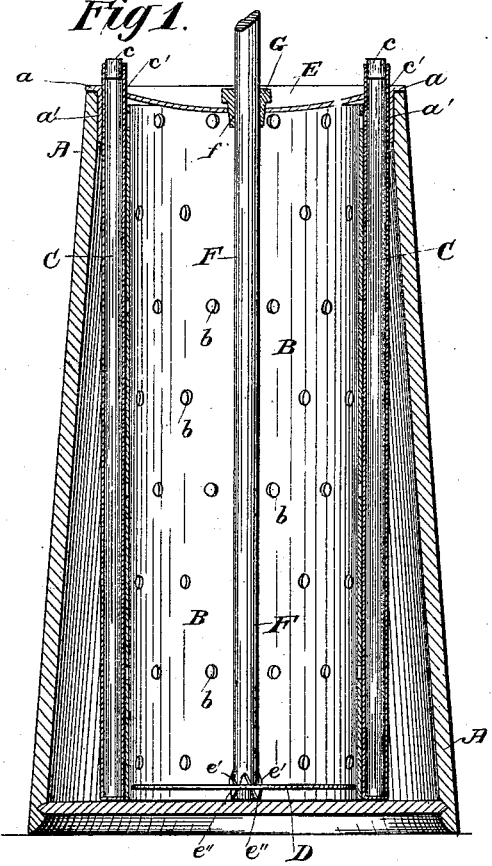
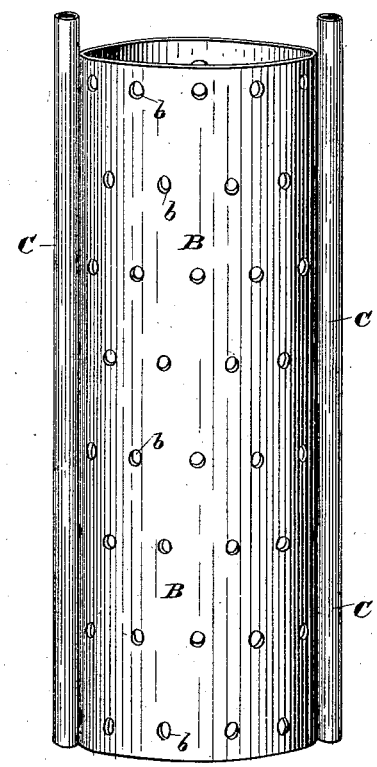
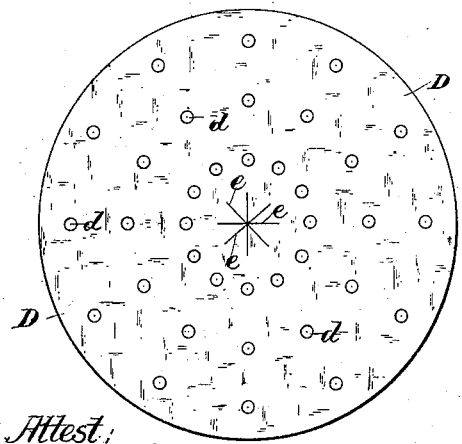
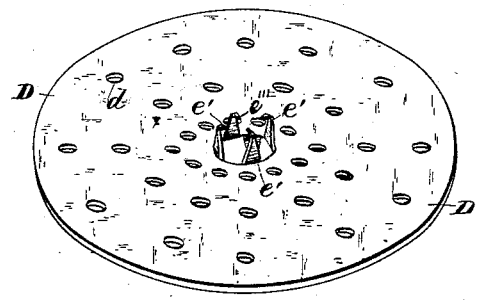
Attest:
Geo. T. Smallwood Jr.
L. M. Hopkins.
Inventor:
Henry T. Davis
By Knight Bros.
attys

UNITED STATES PATENT OFFICE.

HENRY T. DAVIS, OF SHERMAN, TEXAS.

RECIPROCATING CHURN.

SPECIFICATION forming part of Letters Patent No. 254,121, dated February 28, 1882.

Application filed April 14, 1881. (No model.)

*To all whom it may concern:*

Be it known that I, HENRY T. DAVIS, a citizen of the United States, residing at Sherman, in the county of Grayson and State of Texas, have invented Improvements in Reciprocating Churns, of which the following is a specification.

My invention consists in a perforated open-ended flangeless shell, adapted for application to the common vertical dash-churn, and having at its sides vertical tubes or pipes extending through the cover or lid for the reception of hot or cold water, which thus modifies the temperature of the cream as required without mixing therewith.

In the accompanying drawings, Figure 1 is a vertical section of the churn. Fig. 2 is a perspective view of the perforated shell with its attached tubes. Fig. 3 is a plan of the perforated disk, showing the radial cuts in the center by which the attaching-lips are formed. Fig. 4 is a perspective view of the dasher-head with the lips turned up and down in readiness for the reception of the dasher-rod.

A represents a churn-tub of common form.

B is a cylindrical open-ended flangeless shell, made of perforated metal, and of suitable diameter to slip easily within the tub A. The perforations in the shell are shown at $b\ b$. On the outside of the perforated shell B are any desirable number of tubes or pipes, C C, extending through the cover and adapted for the reception of hot or cold water, accordingly as it may be necessary to raise or lower the temperature of the cream in order to facilitate churning.

$c\ c$ are the stoppers for the pipes.

E is the cover or lid, constructed with a horizontal rim, $a$, and downwardly-projecting flange $a'$, which holds the shell in position within the tub A.

$f\ c'\ c'$ are perforations in the cover, through which the upper ends of the dasher-rod and pipes pass. G is a packing of rubber surrounding the rod in the cover.

D represents the dasher-head, having numerous holes, $d$, and formed of a disk of metal with radial slits $e$, as shown in Fig. 3, forming between them pointed lips, Fig. 4, which, being turned alternately up ($e'$) and down, ($e''$,) constitute a socket for the reception of the dasher-staff F. By turning inward the points $e'''$ of the lips $e'\ e''$, as shown in Fig. 4, and driving them into the substance of the staff F, as illustrated in Fig. 1, the staff is firmly connected to the dasher-head without the use of nails.

In operation the vertical motion of the perforated dasher within the cream carries an amount of air below the surface, and, in connection with the perforations in the casing B, produces great friction throughout the whole body of cream. Moreover, the agitation carries the cream around on the outside of the casing B, causing currents over the surfaces of the tubes C, so as to rapidly effect the desired modification in the temperature of the cream. By these combined agencies, and especially by the cutting action of the edges of the perforations $b$ and $d$, butter is produced with great rapidity.

I am aware that churns have before been made with perforated chambers, within which the vertical reciprocating dasher works, while the cream is contained in said chamber and in a space around it.

I am also aware that vessels of various forms have been used for the reception of warming and cooling appliances.

What I claim as new, and wish to secure by Letters Patent, therefore, is—

In a reciprocating churn, the vertical open-ended flanges, perforated shell B, side tubes or pipes, C C, attached thereto, and cover E, formed with perforations $f\ c'\ c'$ for receiving the upper ends of the dasher-rod and tubes or pipes, in combination with the rod F, dasher D, and tub A, as set forth.

HENRY T. DAVIS.

Witnesses:
 R. M. FISHER,
 J. H. LUSK.